(12) United States Patent
Nakamura (10) Patent No.: US 7,881,508 B2
(45) Date of Patent: Feb. 1, 2011

(54) METHOD, APPARATUS, AND PROGRAM FOR JUDGING MEDICAL IMAGES

(75) Inventor: Keigo Nakamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 951 days.

(21) Appl. No.: 11/580,943

(22) Filed: Oct. 16, 2006

(65) Prior Publication Data

US 2007/0086641 A1  Apr. 19, 2007

(30) Foreign Application Priority Data

Oct. 14, 2005  (JP) .............................. 2005-299552

(51) Int. Cl.
*G06K 9/00* (2006.01)

(52) U.S. Cl. ...................................... 382/128; 382/308

(58) Field of Classification Search ................. 600/300; 382/100, 128, 129, 130, 131, 132, 133, 134, 382/173, 181; 128/920; 378/1, 37, 21, 41, 378/42, 38, 44, 51
See application file for complete search history.

(56) References Cited

U.S. PATENT DOCUMENTS

| | | | | |
|---|---|---|---|---|
| 5,709,206 | A * | 1/1998 | Teboul .......................... 600/437 |
| 6,185,320 | B1 * | 2/2001 | Bick et al. .................... 382/132 |
| 6,282,305 | B1 * | 8/2001 | Huo et al. ..................... 382/128 |
| 2004/0081343 | A1 * | 4/2004 | Takeo et al. .................. 382/131 |
| 2005/0111721 | A1 * | 5/2005 | Bamberger et al. .......... 382/132 |
| 2005/0259882 | A1 * | 11/2005 | Dewaele ....................... 382/243 |

FOREIGN PATENT DOCUMENTS

| | | |
|---|---|---|
| JP | 04-000435 A | 1/1992 |
| JP | 06-078910 A | 3/1994 |
| JP | 2004-290329 A | 10/2004 |
| JP | 2007-029260 A | 2/2007 |

OTHER PUBLICATIONS

Notification of Grounds for Rejection, dated Oct. 26, 2010, issued in corresponding JP Application No. 2005-299552, 5 pages in English and Japanese.

* cited by examiner

*Primary Examiner*—Bhavesh M. Mehta
*Assistant Examiner*—Tahmina Ansari
(74) *Attorney, Agent, or Firm*—Sughrue Mion, PLLC (57) ABSTRACT

Notice is given when a medical image does not include an appropriate region imaged therein. At least one anatomical structure is extracted from a medical image obtained by an imaging apparatus. Whether a diagnostic region imaged within the medical image is appropriate for conducting diagnosis is judged, employing the at least one extracted anatomical structure as a reference. Further, display is performed on a console, based on the obtained judgment results.

5 Claims, 9 Drawing Sheets

METHOD, APPARATUS, AND PROGRAM FOR JUDGING MEDICAL IMAGES

BACKGROUND OF THE INVENTION

1. Field of the Invention

The present invention relates to a method, an apparatus, and a program, capable of judging whether a medical image is appropriate for conducting diagnosis.

2. Description of the Related Art

Figure 17:
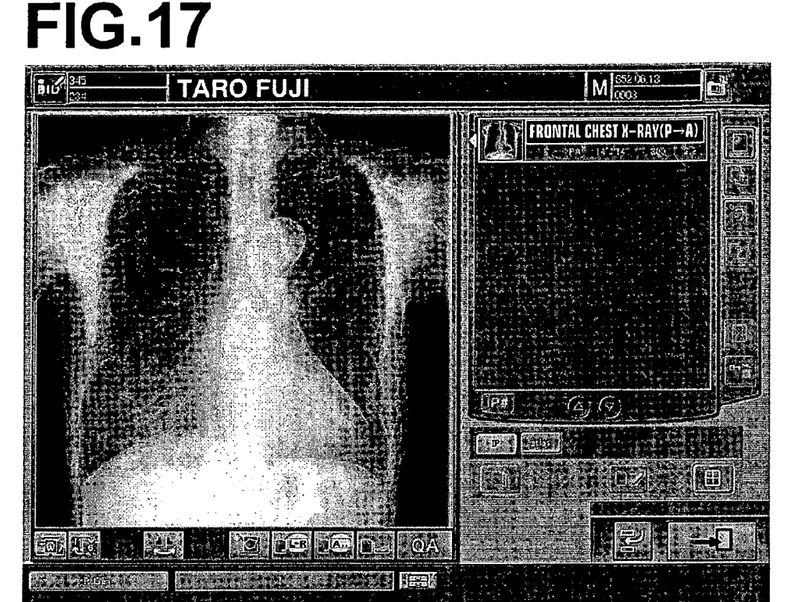
FIG. 17 illustrates an example of a console screen.
Figure 18:
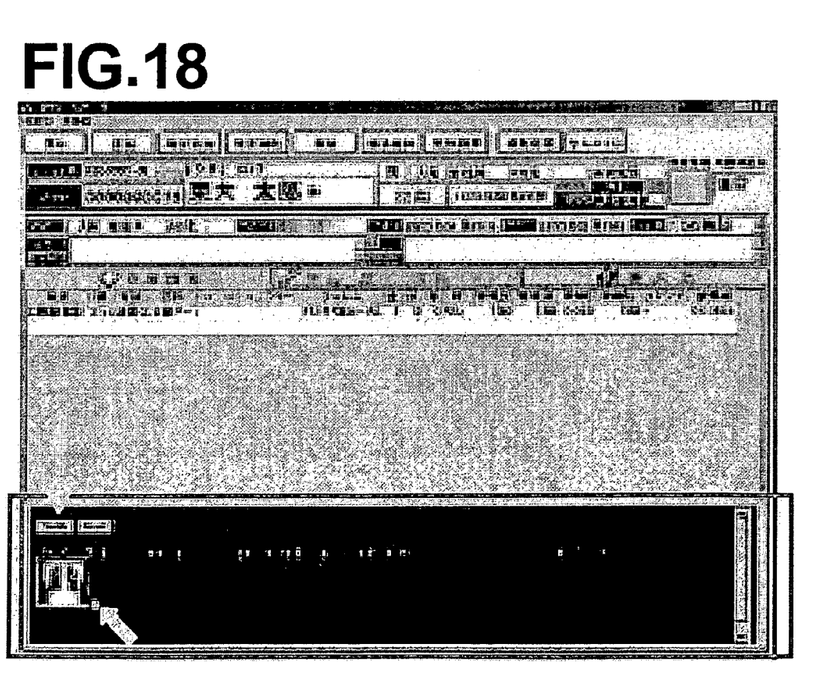
FIG. 18 illustrates an example of a QA terminal screen.

Conventionally, medical images obtained by medical image photography apparatuses such as CR (Computed Radiography) apparatuses are inspected to judge whether they are suitable for diagnosis. The inspection is performed by displaying the medical images on a console, such as that illustrated in FIG. 17, or at a QA (Quality Assurance) terminal, as illustrated in FIG. 18.

The items to be inspected are: (1) whether a portion to be observed in included in the image; (2) whether density contrast is appropriate; and (3) whether an image of an appropriate range has been obtained such that comparative observations can be performed within the image. The items are checked by visual inspection.

Japanese Unexamined Patent Publication No. 2004-290329 discloses an apparatus that automatically judges the results of the visual inspection. The apparatus statistically analyzes the values of pixels included within obtained images. The apparatus displays a warning in the case that the statistical analysis results indicate that the image has not been photographed at an appropriate density. The apparatus also displays a warning in the case that the imaged portion, recognized from the shape of an obtained image region, does not match the portion which was instructed to be imaged when imaging was ordered.

Even if statistical analysis is performed to judge whether an image has been photographed with appropriate density, or if it is judged whether an imaged portion matches a portion to be diagnosed, there are cases in which the entirety of a region necessary for diagnosis is not imaged. For example, in mammography, it is important for all of the mammary glands to be included in an image in order to perform diagnosis. However, the aforementioned apparatus cannot judge whether all of the mammary glands are included in the image.

SUMMARY OF THE INVENTION

The present invention has been developed in view of the foregoing circumstances. The object of the present invention is to provide a medical image judging method, a medical image judging apparatus, and a medical image judging program, capable of issuing warnings when a medical image does not picture the entirety of an appropriate range.

The medical image judging apparatus of the present invention comprises:

memory means, for recording a medical image that includes an image of a predetermined diagnostic region, which is a target of diagnosis, therein;

structural element extracting means, for extracting at least one anatomical structure from within the medical image;

judging means, for judging whether the diagnostic region within the medical image is appropriate for conducting diagnosis, with the extracted structural element as a reference; and judgment result output means, for outputting the judgment results obtained by the judging means.

The medical image judging method of the present invention comprises:

recording a medical image that includes an image of a predetermined diagnostic region, which is a target of diagnosis;

extracting at least one anatomical structure from within the medical image;

judging whether the diagnostic region within the medical image is appropriate for conducting diagnosis, with the extracted structural element as a reference; and outputting the judgment results obtained by the judging means.

The medical image judging program of the present invention causes a computer to function as:

memory means, for recording a medical image that includes an image of a predetermined diagnostic region, which is a target of diagnosis, therein;

structural element extracting means, for extracting at least one anatomical structure from within the medical image;

judging means, for judging whether the diagnostic region within the medical image is appropriate for conducting diagnosis, with the extracted structural element as a reference; and judgment result output means, for outputting the judgment results obtained by the judging means.

The "at least one anatomical structure" refers to structures and organs that constitute a human body, such as pectoral muscles, breasts, and lung fields.

The "at least one anatomical structure" extracted by the "structural element extracting means" refer both to those that include regions to be diagnosed, and those that do not include regions to be diagnosed.

The phrase "outputting the judgment results" includes various forms of output, such as: displaying whether the image is appropriate for conducting diagnosis; providing the judgment results by audio guidance, and printing out the judgment results.

The judging means may judge whether the diagnostic region within the medical image includes a range, which is appropriate for use in conducting diagnosis.

In the case that the medical image is a mammogram, it is desirable that:

the structural element extracting means extracts a pectoral major muscle and a breast; and the judging means performs judgment, based on the ratio of the area of the breast and the area of the pectoral major muscle within the diagnostic region.

In the case that the structural element extracting means extracts a nipple from the extracted breast, it is desirable that:

the judging means performs judgment, based on the position of the lowermost portion of the pectoral major muscle and the position of the nipple.

The "position of the lowermost portion of the pectoral major muscle" refers to the position of the portion of the pectoral major muscle closest to a subject's feet.

Note that the medical image judging program of the present invention may be provided being recorded on computer readable media. Those who are skilled in the art would know that computer readable media are not limited to any specific type of device, and include, but are not limited to: floppy disks; RAM's; ROM's; CD's; magnetic tapes; hard disks; and internet downloads, by which computer instructions may be transmitted. Transmission of the computer instructions through a network or through wireless transmission means is also within the scope of the present invention. In addition, the computer instructions may be in the form of object, source, or executable code, and may be written in any language, including higher level languages, assembly language, and machine language.

According to the present invention, whether a medical image is appropriate for use in conducting diagnosis of a diagnostic region is automatically judged, using anatomical structures within the medical image as references. By displaying the judgment results, it is possible of issuing warnings even in cases that visual inspections misjudge medical images. In addition, because the judgment results are immediately displayed, it is possible to re-photograph a subject before he or she leaves an imaging facility.

In the case that the medical image is a mammogram, the structural element extracting means extracts a pectoral major muscle and a breast. Therefore, it becomes possible to judge whether the medical image is appropriate for use in diagnosis, based on the ratio of the area of the breast and the area of the pectoral major muscle within the diagnostic region.

Further, if the nipple is extracted, it becomes possible to judge whether all of the mammary glands have been photographed, based on the position of the lowermost portion of the pectoral major muscle and the position of the nipple.

BEST MODE FOR CARRYING OUT THE INVENTION

Figure 1:
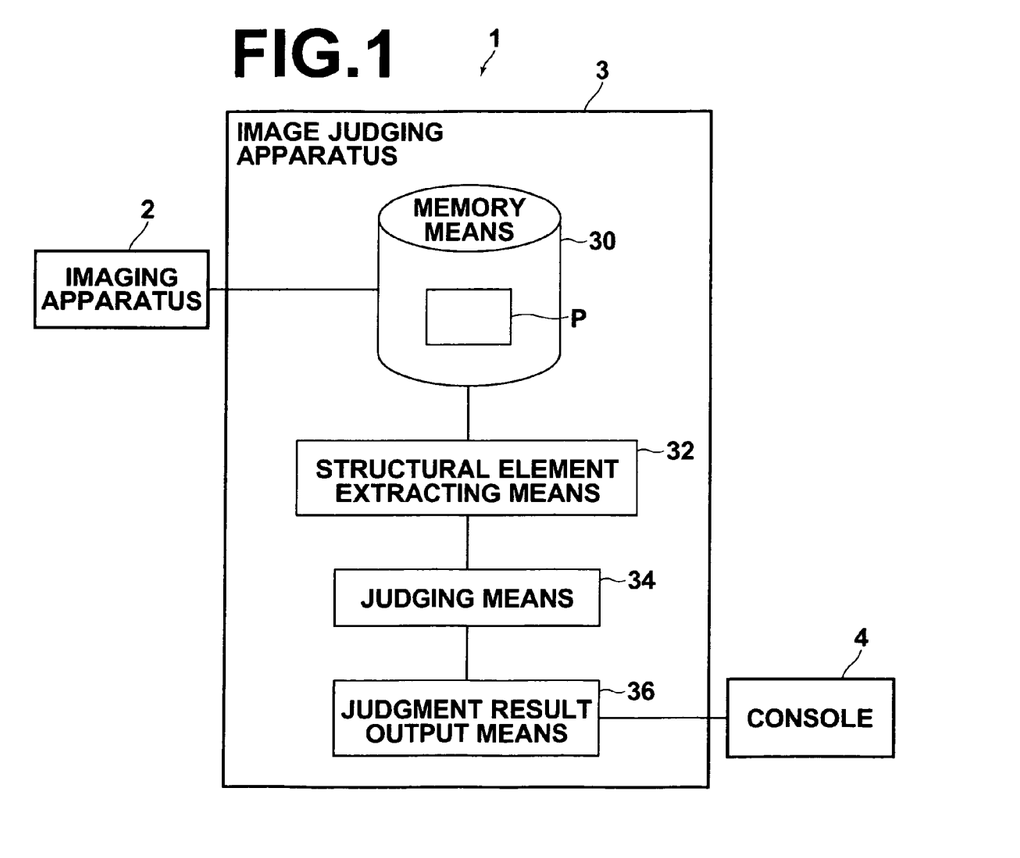
FIG. 1 is a schematic block diagram that illustrates the construction of a medical image judging system.

Hereinafter, an embodiment of the present invention will be described with reference to the attached drawings. FIG. 1 is a schematic block diagram that illustrates the construction of a medical image judging system that includes the image judging apparatus 3 of the present embodiment.

The medical image judging system comprises: an imaging apparatus 2, such as an X-ray imaging apparatus; the image judging apparatus 3, for judging whether medical images P photographed by the imaging apparatus 2 to include predetermined diagnostic regions are suitable for conducting diagnosis; and a console 4, for displaying the judgment results of the image judging apparatus 3.

The image judging apparatus 3 is a computer, such as a workstation, in which an image processing software program is installed.

The image judging apparatus 3 comprises: memory means 30, for recording the medical images P therein; structural element extracting means 32, for extracting at least one anatomical structure from the medical images P; judging means 34, for judging whether the medical images P are suitable for conducting diagnosis on the diagnostic region pictured therein, employing the extracted anatomical structures as references; and judgment result output means 36, for outputting the judgment results obtained by the judging means 34.

Figure 2:
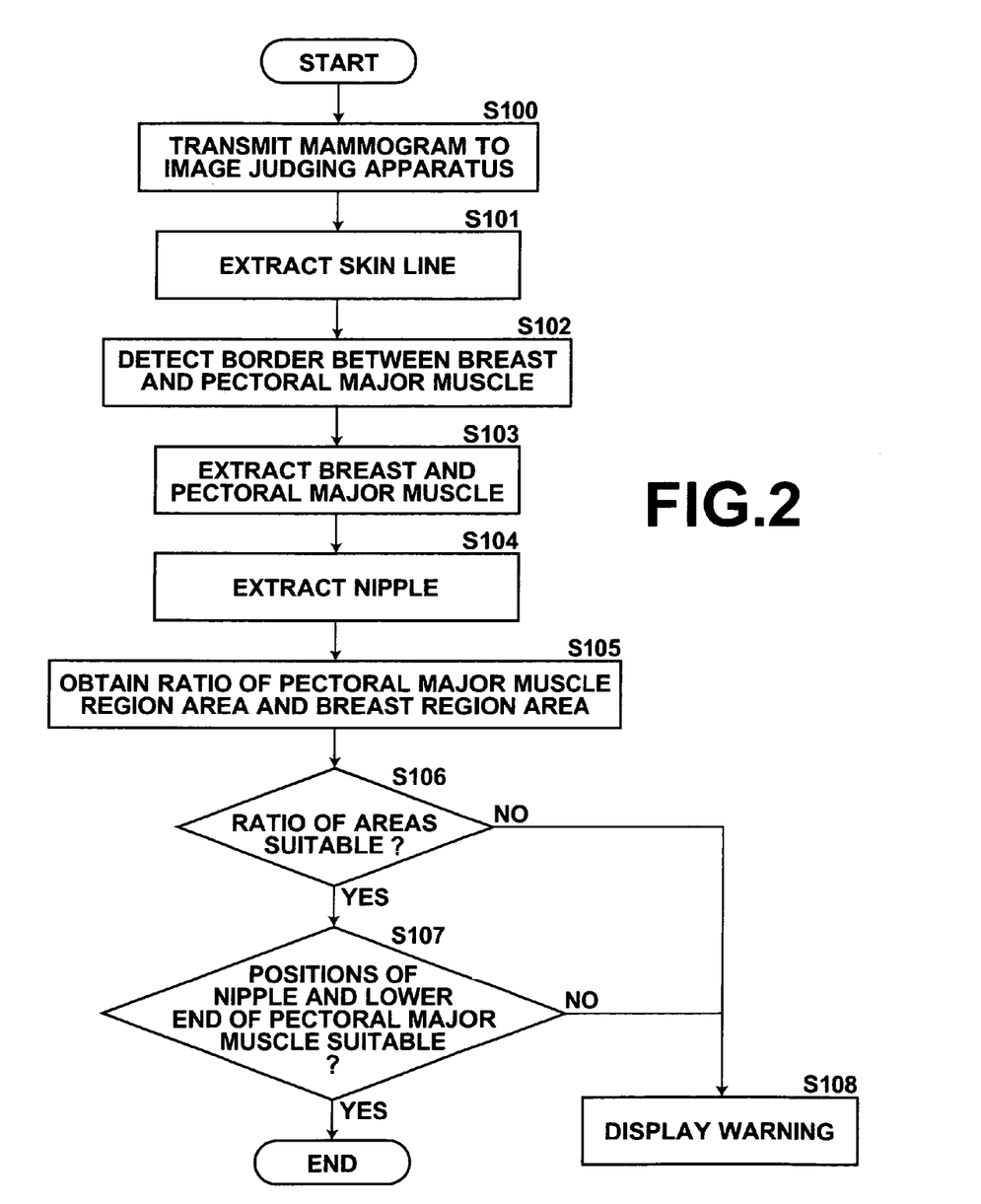
FIG. 2 is a first flow chart that illustrates the operation of the medical image judging system.

Here, the operation of the medical image judging system 1 that includes the image judging apparatus 3 of the present invention will be described with reference to FIG. 2. FIG. 2 is a flow chart that illustrates the operation of the medical image judging system 1 in the case that the medical images P are mammograms.

First, a patient (subject) follows operator instructions to have her breast photographed by the imaging apparatus 2. The obtained mammogram P is transmitted from the X-ray imaging apparatus 2 to the image judging apparatus 3, and recorded in the memory means 30 (step S100).

It is necessary for the retromammary fat layer to be sufficiently extracted from mammograms P. Therefore, it is desirable for the breast to be photographed on the pectoral major muscle. In addition, it is important for the pectoral major muscle to be pictured within mammograms P in order to perform diagnostic reading thereof. It is necessary to include the pectoral major muscle in the mammograms P, to ensure that all of the mammary glands are included therein. However, if the pectoral major muscle is featured excessively in an image, the contrast of the image decreases, and the image becomes unsuitable for use in diagnosis.

Therefore, the structural element extracting means 32 extracts pectoral major muscles and breasts.

The pectoral major muscle is extracted according to the following steps in the case that a mammogram P is an MLO (Medio Lateral Oblique) image.

Figure 3:
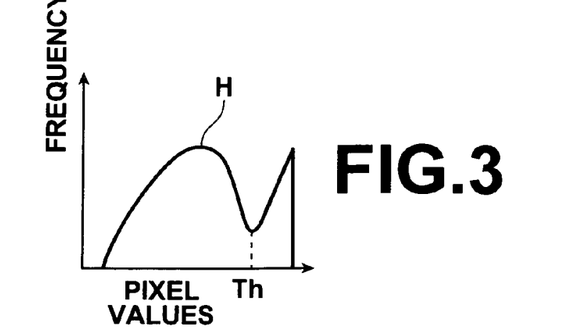
FIG. 3 is a histogram of pixel values that appear in a mammogram.
Figure 4:
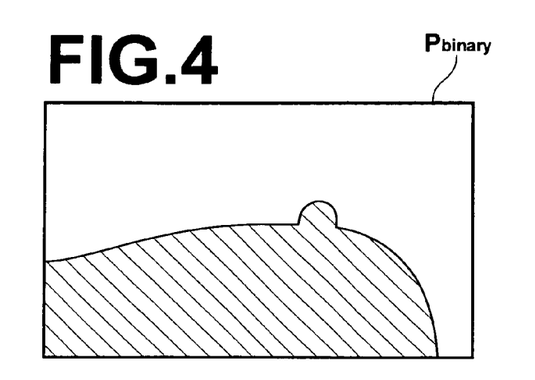
FIG. 4 illustrates a binarized mammogram.

First, the contour of the breast is detected, based on a histogram H of the mammogram P. When a histogram H of the mammogram P is generated, the peaks of pixel values differ in a breast region and a background, as illustrated in FIG. 3. The peak of the breast region appears close to the center of the histogram H, and the peak of the background appears toward the right side thereof. The pixel value Th at the border of the breast region and the background region is designated as a threshold value, to perform a binarizing process. Thereby, a binarized mammogram $P_{binary}$ as illustrated in FIG. 4 is generated, in which the breast region (the hatched portion) and the background region are separated.

Figure 5:
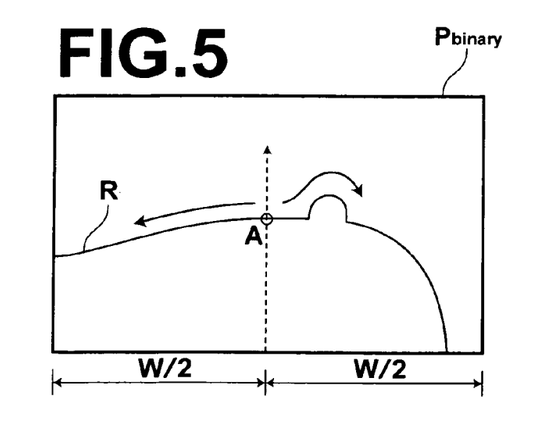
FIG. 5 is a diagram for explaining a method for extracting a skin line.

In the case that the chest wall within the mammogram $P_{binary}$ is positioned at the lower side of the image, a search is conducted upward from the bottom of the image along a line (the broken line) that passes through the center of the width (W/2) of the image, as illustrated in FIG. 5. The point on the line at which the breast region borders the background region is designated as A. Then, searches are conducted toward the left and the right of point A, to detect the contour R of the breast (hereinafter, referred to as "skin line R"). Specifically, for example, bordering pixels are sequentially searched for toward the left and right of point A from among pixels adjacent thereto, and the bordering pixels are connected to extract the skin line R (step S101).

Figure 6:
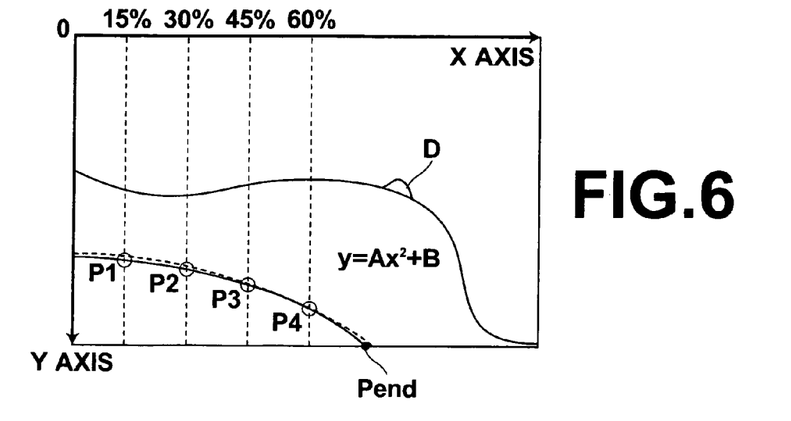
FIG. 6 is a diagram for explaining a method for extracting a pectoral major muscle.

Next, as illustrated in FIG. 6, scanning employing derivative operators is performed along four lines (the vertical broken lines) that extend downward from the skin line R. The scanning employing derivative operators is performed according to Formula (1) below. Thereby, points $P_1$, $P_2$, $P_3$, and $P_4$ at the border of the mammary glands and the pectoral muscle, where pixel values change drastically, are detected.

$$D(i, j) = f(i, j-3) + f(i, j-2) - f(i, j+2) - f(i, j+3) \quad (1)$$

wherein:
d(i, j): derivatives
f(i, j): pixel values of the original image

A quadratic curve represented by the following Formula (2) is calculated from the plurality of points $P_1$, $P_2$, $P_3$, and $P_4$ by the method of least squares, for example.

$$y = ax^2 + b (a>0, b>0) \quad (2)$$

a and b of the above formula are determined using the points $P_1$, $P_2$, $P_3$, and $P_4$, to obtain the border of the pectoral major muscle and the breast (step S102).

The portion of the image lower than the curve of Formula (2) is extracted as the pectoral major muscle, and the portion of the image between the curve and the skin line R is extracted as the breast (step S103).

Figure 7:
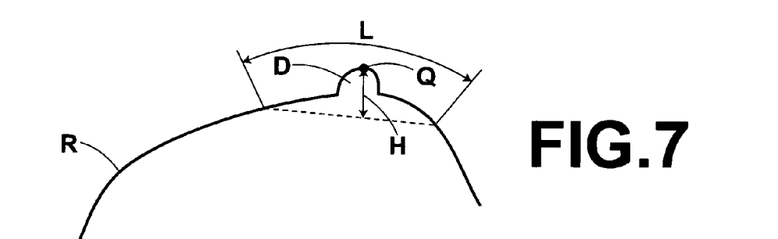
FIG. 7 is a diagram for explaining a method for detecting a nipple employing a contour portion of the skin line and a line that connects the ends of the contour portion.

Next, an example of a method for detecting a nipple will be described. First, a flattened breast contour is obtained, by flattening the skin line R, which is the contour of the breast. A nipple is detected, based on the distance between the flattened breast contour and the breast contour. Specifically, a curve L (contour portion) is set along the skin line R, as illustrated in FIG. 7. A line that connects the two ends of the curve L is designated as the flattened breast contour, and a distance H between the center of the line and the center of the curve L is obtained. A plurality of curves L are set while gradually shifting the position thereof along the skin line R. The distance H between the center of each curve and each line is obtained, and a nipple D is extracted as being in the vicinity of a point Q at which the value H/L is the greatest (step S104). At this time, the amount by which the curve L is shifted is set such that the center of the curve L is positioned at the nipple on the skin line R at least once, based on statistical sizes of nipples.

Then, the judging means 34 judges whether the breast pictured in the mammogram P is suitable for conducting diagnosis.

The ratio of the area of the pectoral major muscle, which is the portion of the image below the curve represented by Formula (2), and the area of the breast region, which is the portion of the image between the curve represented by Formula (2) and the detected skin line R, is calculated. The ratio E of the area of the pectoral major muscle with respect to the breast region is obtained by the following formula (step S105)

E=(area of pectoral major muscle)/(area of breast)× 100

At this time, images suitable for diagnosis are those that have E within a range of 10%<E<50%. If E is outside of this range, the image is judged to be not suitable for diagnosis (step S106).

Further, even if the above condition is satisfied, if the position of the nipple and the position of the lower end $P_{end}$ of the pectoral major muscle are such that the position of the nipple along the X axis>the position of $P_{end}$ along the X axis as illustrated in FIG. 5, it is judged that the image is not suitable for conducting diagnosis (step S107). This is because such positioning of the nipple and the lower end $P_{end}$ pectoral major muscle does not ensure that the breast region is sufficiently pictured in the image.

In the case that the image is judged to be not suitable for conducting diagnosis as described above, the judgment result output means 36 displays a warning on the console 4 or on a QA terminal (step S108). The imaging operator confirms the warning displayed on the console 4, and instructs the patient that further photography is necessary.

Figure 8:
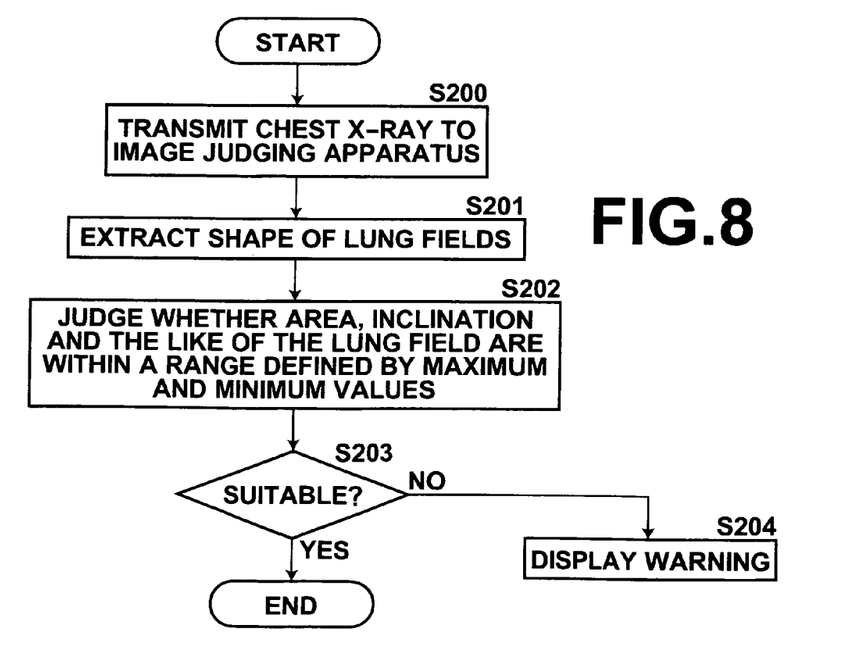
FIG. 8 is a second flow chart that illustrates the operation of the medical image judging system.

Next, the operation of the medical image judging system 1 in the case that the medical image P is a chest X-ray obtained by the X-ray imaging apparatus will be described. FIG. 8 is a flow chart that illustrates the operation of the medical image judging system 1 in the case that the medical image P is a chest X-ray.

First, a patient (subject) follows instructions by an operator to have their chest imaged by the X-ray imaging apparatus 2. The obtained chest X-ray P is transmitted from the X-ray imaging apparatus 2 to the image judging apparatus 3, and recorded in the memory means 20 (step S200).

Figure 9:
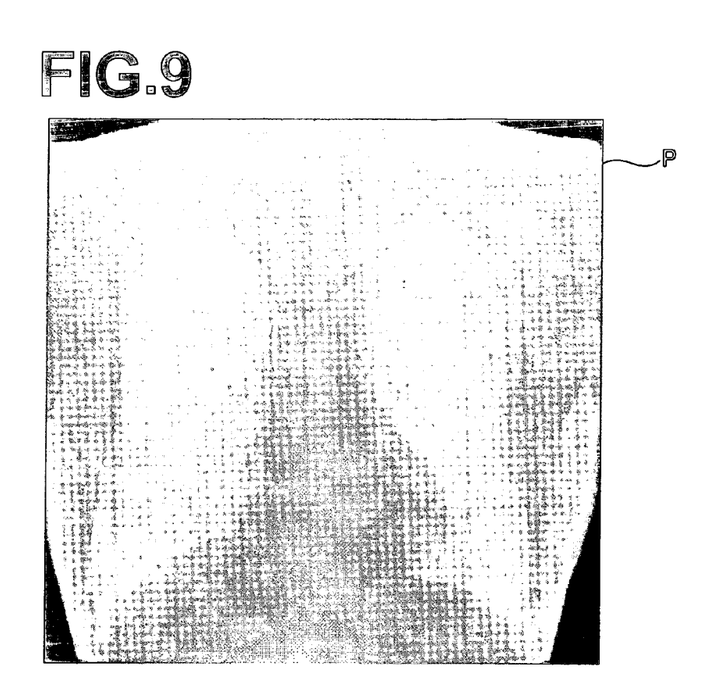
FIG. 9 is an example of an original chest X-ray image.
Figure 10:
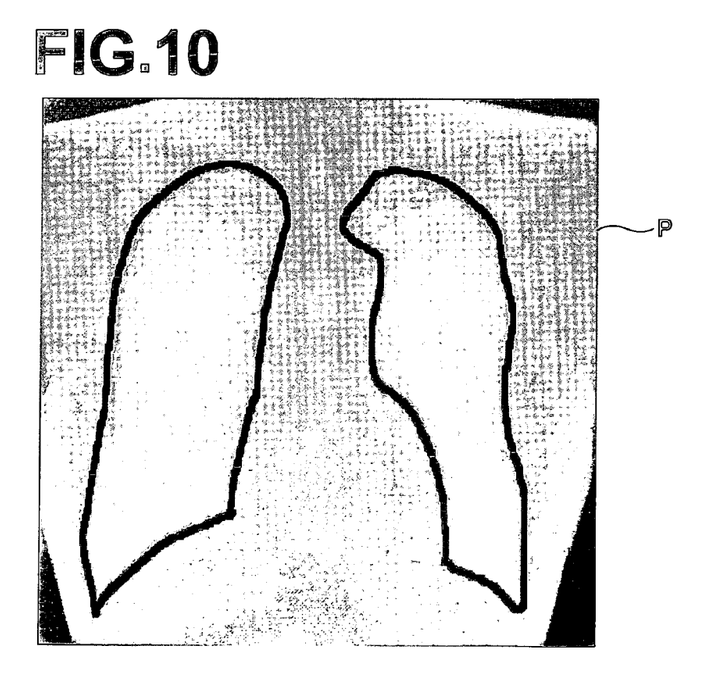
FIG. 10 is a chest X-ray, in which lung fields have been outlined.

The structural element extracting means 22 automatically extracts the shape of a lung field (contour of the cardiothoracic region) from the chest X-ray P (an image such as that illustrated in FIG. 9) (step S201). Specifically, for example, polar coordinate conversion is performed with a point at the approximate center of the cardiothoracic region as a reference. Then, a method in which the contour of the cardiothoracic region is automatically extracted by performing template matching processes on the polar coordinate plane may be employed (such as the method proposed in Japanese Unexamined Patent Publication No. 2003-006661).

Maximum and minimum values for the area of the lung field are set in advance in the judging means 34, in order to enable judgment regarding whether the photographed lung field is of an appropriate size. It is judged whether the area of the extracted lung field is within a range between the set maximum and minimum value (step S202). Specifically, the area $A_{inner}$ (cm$^2$) of the lung field can be obtained according to Formula (3) below, by designating the area of the entire image as $A_{all}$ (cm$^2$), the total number of pixels within the image to $P_{all}$, and the number of pixels within the lung field as $P_{inner}$.

$$A_{inner} = A_{all} \times \frac{P_{inner}}{P_{all}} \quad (3)$$

In the case that the obtained area $A_{inner}$ is outside of the range (step S203), the judgment result output means 36 causes a warning to be displayed on the console 4 (step S204).

Figure 11:
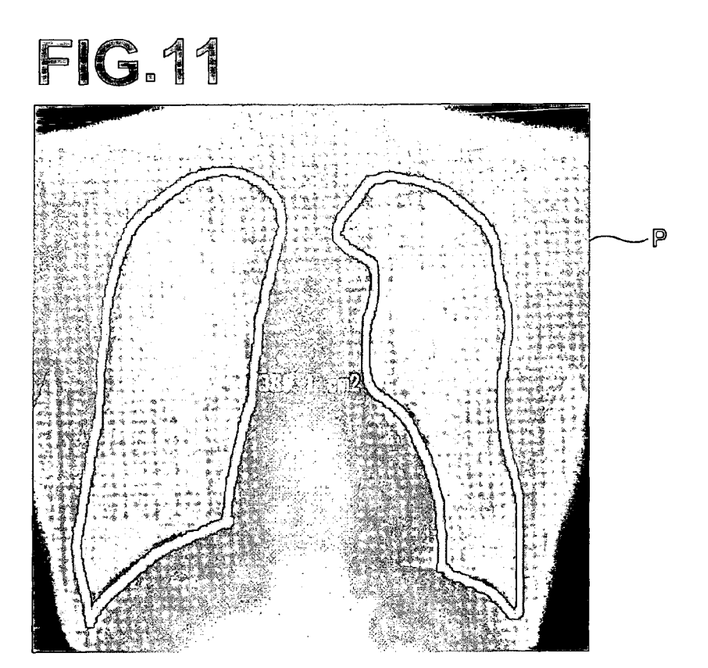
FIG. 11 is an example of a chest X-ray, in which the area of lung fields is displayed.

Alternatively, as illustrated in FIG. 11, the calculated area of the lung field (389.1 cm$^2$ in the example of FIG. 11) may be displayed on the console 4 by the judgment result output means 36, and the operator can confirm the displayed area.

As a further alternative, the areas of the left and right lung fields may be obtained separately. The areas thereof may be compared against maximum and minimum values therefor (step S202), and a warning may be displayed on the console 4 by the judgment result output means 36 (step S204) if the areas are outside the ranges (step S203). If the areas of each of the left and right lung field regions are obtained in this manner, the operator can confirm whether one of the lungs has not been photographed in a sufficiently expanded state, due to the patient's posture or due to insufficient inspiration.

Figure 12:
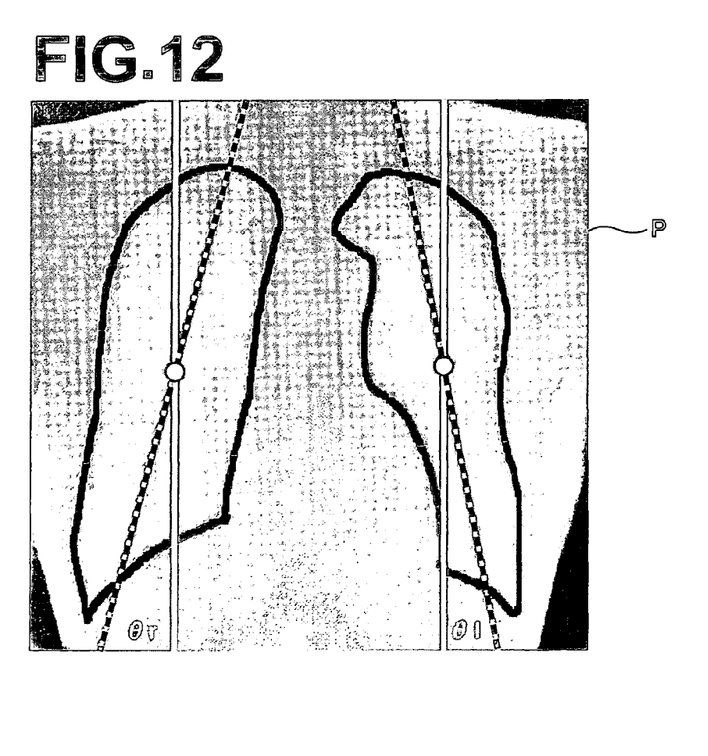
FIG. 12 is a diagram for explaining a method for calculating the inclination of lung fields.

In addition, the inclination of the lung fields can be obtained, in order for the judging means 34 to judge whether the lungs have been photographed in an upright state or in a state in which both lungs are fully expanded. The inclinations of the left and right lung fields can be calculated in the following manner. First, as illustrated in FIG. 12, the center of gravity (indicated by the white circles) and the main axis (the broken lines) of each lung field region are obtained. The main axes of the lung field regions can be obtained by main component analysis (main component analysis with respect to the positions of pixels included within the lung field regions). Next, vertical lines (the white lines) are drawn through the centers of gravity, and the angles $\theta_r$ and $\theta_l$ formed by the main component axes and the vertical lines are obtained. An average angle of inclination $\theta_{ave}$ of the entire lung field region is obtained according to the following Formula (4).

$$\theta_{ave} = \frac{\theta_r + \theta_l}{2} \quad (4)$$

wherein:

$\theta_{ave}$: inclination of the lung field region
$\theta_{ave}$: inclination of the main axis of the right lung region
$\theta_{ave}$: inclination of the main axis of the left lung region The average inclination $\theta_{ave}$ of the entire lung field region is compared against maximum and minimum values therefor (step S202). In the case that the average inclination is outside of the range defined by the maximum and minimum values (step S203), the judgment result output means 36 may display a warning on the console 4 (step S204).

Even in the case that the inclination of the lung field is approximately zero at the time of photography, the main axis of one of the left and right lung field regions is not inclined at 0 degrees, but rather at approximately ±5.0 degrees (depending on individual differences and positioning). Therefore, in the case that only one of the two lungs is extracted, the inclination of the main axis of the other lung field region may be fixed at 5.0 degrees when performing the above calculation.

Figure 13:
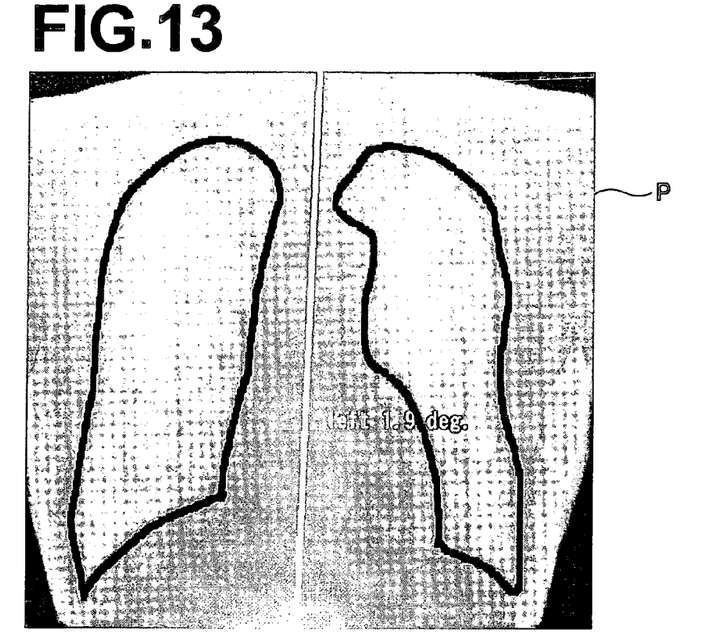
FIG. 13 is an example of a chest X-ray in which the inclination of lung fields is displayed.

The inclination of the lung field may be displayed as numerical values on the console 4 by the judgment result output means 36. In addition, a vertical line that passes through the center of the image, having the same inclination as that of the lung field, may also be displayed, as illustrated in FIG. 13.

A configuration may be adopted, wherein the judging means 34 judges whether the lung field region runs off outside the image, by obtaining data regarding the distances from the edges of the image to the lung field as indices. The distances from the edges of the image to the lung field can be derived by obtaining the distance from each pixel at the edges of the image to the contour of the lung field region from the number of pixels $L_i$ on a line from the edges of the image to the contour of the lung field region and a length $D_{pix}$ (cm) corresponding to a single pixel within the image. The minimum values for the distances are obtained by the following Formula (5).

$$D_{min} = \text{Min}(L_i) \times D_{pix} \quad (5)$$

wherein:

$D_{min}$: distance from the edges of the image to the lung field
$L_i$: linear distance from the edges of the image (in pixels)
$D_{pix}$: length corresponding to a single pixel in the image The linear distances between the edges of the image and the contour of the lung field region are compared against maximum and minimum values therefor (step S202). In the case that the distances are outside of a range defined by the maximum and minimum values (step S203), a warning may be displayed on the console 4 by the judgment result output means 36 (step S204).

Figure 14:
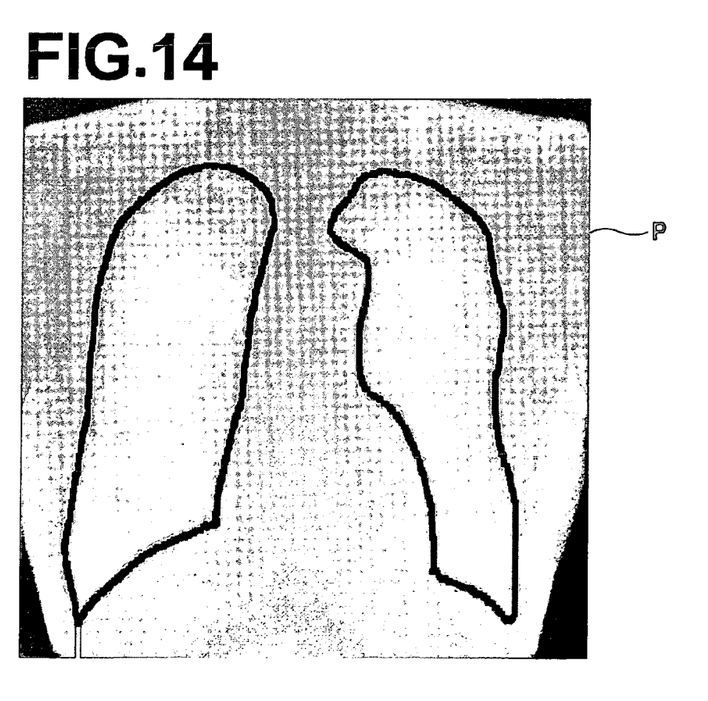
FIG. 14 is an example of a chest X-ray, in which the distance between the lower edge of an image and a lung field region is indicated by a line.
Figure 15:
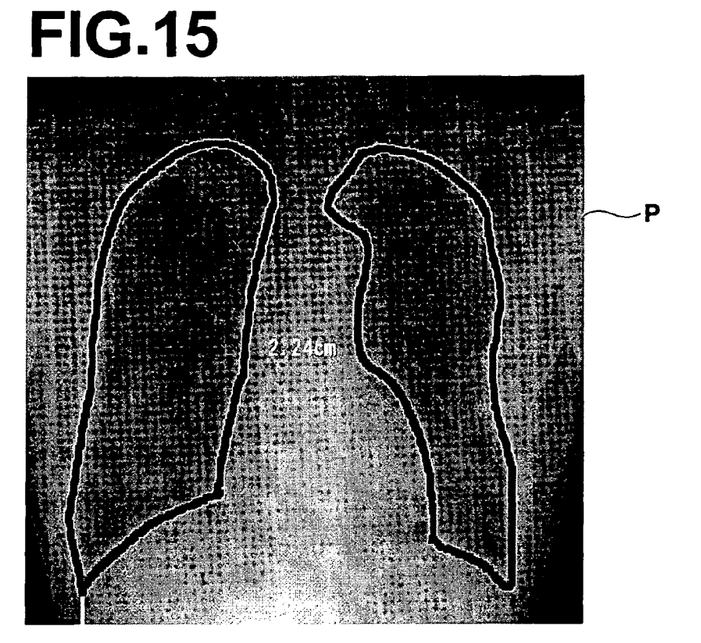
FIG. 15 is an example of a chest X-ray, in which the distance between the lower edge of an image and a lung field region is indicated by a line and a numerical value.

The judgment result output means 36 may cause the distance between the edge of the image and the lung field region to be displayed by a line on the console 4, as illustrated in FIG. 14. Further, as illustrated in FIG. 15, a numerical value that represents the distance may be displayed in addition to the line.

Figure 16:
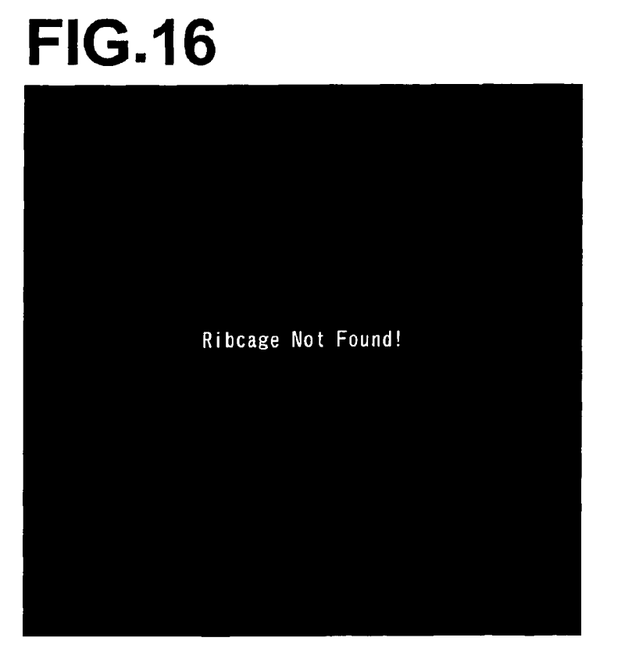
FIG. 16 is an example of a warning indicating that a cardiothoracic region could not be detected.

In the case that the image is unclear and automatic extraction of the cardiothoracic region is difficult, a message indicating that the cardiothoracic region cannot be found is displayed, as illustrated in FIG. 16. In this case as well, re-photography becomes necessary, and the operator instructs the patient to be photographed again.

After the image of the lung field, the warning, and the numerical values are displayed on the console 4, the operator may judge that re-photography is necessary. In this case, the patient is instructed to be photographed again.

As described above in detail, by employing the medical image judging apparatus of the present invention, it becomes possible to confirm photographed images immediately. Therefore, patients can be instructed to be photographed again immediately, if necessary.

In the above description, mammograms and chest X-rays were described in detail. However, images of other parts of the body can be judged regarding whether they are suitable for use in diagnosis, by extracting anatomical structures, and using the extracted anatomical structures as references.

What is claimed is:

1. A medical image judging apparatus, comprising:
    memory means, for recording a medical image that includes an image of a predetermined diagnostic region, which is a target of diagnosis, therein;
    structural element extracting means, for extracting at least one anatomical structure comprising a breast and pectoral major muscle from within the medical image;
    judging means, for judging whether the diagnostic region comprising a breast within the medical image is appropriate for conducting diagnosis, with the extracted structural element as a reference;
    judgment result output means, for outputting the judgment results obtained by the judging means; and
    wherein:
    the judging means judges whether the at least one extracted anatomical structure within the diagnostic region within the medical image includes anatomical structures within a range which is appropriate for use in conducting diagnosis; and
    wherein:
    the medical image is a mammogram;
    the structural element extracting means extracts a pectoral major muscle and a breast; and
    the judging means performs judgment, based on the ratio of the area of the pectoral major muscle to the area of the breast within the diagnostic region.

2. A medical image judging apparatus as defined in claim 1, wherein:
    the structural element extracting means further extracts a nipple from the extracted breast region; and
    the judging means performs judgment, based on the position of the lowermost portion of the pectoral major muscle and the position of the nipple.

3. A method for judging medical images, comprising:

recording a medical image to a storage medium that includes an image of a predetermined diagnostic region, which is a target of diagnosis;

extracting at least one anatomical structure comprising a breast and a pectoral major muscle from within the medical image using a processor;

judging whether the diagnostic region comprising a breast within the medical image is appropriate for conducting diagnosis, with the extracted structural element as a reference using a processor; and outputting the judgment results obtained by the judging means, wherein judging whether the diagnostic region is appropriate comprises judging whether the extracted anatomical structure within the diagnostic region within the medical image includes anatomical structures within a range which is appropriate for use in conducting diagnosis, and wherein the medical image is a mammogram, and the extracted anatomical structure includes pectoral major muscle and a breast, and the judging is based on a ratio of the area of the pectoral major muscle to the area of the breast within the diagnostic region.

4. A non-transitory tangible computer readable medium in which a program is recorded, the program causing a computer to function as:

memory means, for recording a medical image that includes an image of a predetermined diagnostic region, which is a target of diagnosis, therein;

structural element extracting means, for extracting at least one anatomical structure comprising a breast and pectoral major muscle from within the medical image;

judging means, for judging whether the diagnostic region comprising a breast within the medical image is appropriate for conducting diagnosis, with the extracted structural element as a reference; and judgment result output means, for outputting the judgment results obtained by the judging means, wherein the judging means judges whether the extracted anatomical structure within the diagnostic region within the medical image includes anatomical structures with a range which is appropriate for use in conducting diagnosis, and wherein the medical image is a mammogram;

and the structural element extracting means extracts a pectoral major muscle and a breast and the judging means performs judgment based on a ratio of the pectoral major muscle to an area of the breast within the diagnostic region.

5. The apparatus of claim 1, wherein the judging means outputs signal to indicate a warning message, indicating to a user that the diagnostic region is not appropriate for conducting diagnosis if a result of the judging is negative.

* * * * *